United States Patent
Diefenbaugh et al.

(10) Patent No.: US 7,484,108 B2
(45) Date of Patent: Jan. 27, 2009

(54) ENHANCING POWER DELIVERY WITH TRANSIENT RUNNING AVERAGE POWER LIMITS

(75) Inventors: Paul Diefenbaugh, Portland, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 11/165,603

(22) Filed: Jun. 23, 2005

(65) Prior Publication Data

US 2006/0294400 A1 Dec. 28, 2006

(51) Int. Cl.
 *G06F 1/26* (2006.01)
(52) U.S. Cl. .................................. 713/300; 713/324
(58) Field of Classification Search ............... None
 See application file for complete search history.

(56) References Cited

U.S. PATENT DOCUMENTS

| | | | | |
|---|---|---|---|---|
| 5,349,668 A | * | 9/1994 | Gladstein et al. ............ 713/340 |
| 5,919,262 A | * | 7/1999 | Kikinis et al. ............... 713/300 |
| 5,926,394 A | * | 7/1999 | Nguyen et al. ................... 716/1 |
| 5,978,921 A | * | 11/1999 | Ryu ............................ 713/300 |
| 6,687,839 B1 | * | 2/2004 | Tate et al. .................... 713/324 |
| 7,062,647 B2 | * | 6/2006 | Nguyen et al. .............. 713/100 |
| 7,197,656 B2 | * | 3/2007 | Nguyen et al. .............. 713/340 |
| 2003/0041272 A1 | * | 2/2003 | Nguyen ....................... 713/300 |
| 2003/0221133 A1 | * | 11/2003 | Nguyen et al. .............. 713/300 |
| 2006/0218423 A1 | * | 9/2006 | Diefenbaugh et al. ....... 713/310 |

* cited by examiner

*Primary Examiner*—Chun Cao
(74) *Attorney, Agent, or Firm*—Blakely, Sokoloff, Taylor & Zafman LLP

(57) ABSTRACT

Systems and methods of power management provide for using transient running average power limits to enhance device power consumption and platform power delivery. A transient running average power limit can be transmitted to a device based on system device load demand and/or a characteristic of a power delivery system associated with the device. The characteristic can convey information such as the power mode, the load current demand and corresponding efficiency of the power delivery system. In one embodiment, the transient running average power limit includes a transient power level and an adjustable time window, where the adjustable time window defines the amount of time for maintaining the transient power consumption of the device at or below the transient power level.

16 Claims, 6 Drawing Sheets

ENHANCING POWER DELIVERY WITH TRANSIENT RUNNING AVERAGE POWER LIMITS

CROSS REFERENCE TO RELATED APPLICATIONS

The present application is related to U.S. patent application Ser. No. 11/091,096, filed on Mar. 28, 2005.

BACKGROUND

1. Technical Field

Certain embodiments of the present invention generally relate to power and thermal management. In particular, some embodiments relate to controlling the transient power consumed by a device in a computing system based on the characteristics of a power delivery system associated with the device.

2. Discussion

As the components of modern day computing systems continue to grow in functionality and complexity, computer designers and manufacturers are often faced with challenges associated with corresponding increases in power and energy consumption. For example, increased power consumption in a microprocessor tends to lead to a corresponding increase in temperature, which can negatively affect performance.

Some models for power and thermal control may monitor the running average power of a hardware device over a relatively large and dynamically adjustable window of time and maintain this average power at or below a given threshold. While such an approach can enable the device to consume above-limit power for short durations (as long as the running average power remains within the limit) without over designs on both device power supply and cooling solution, a number of concerns remain.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Some portions of the detailed description, which follow, may be presented in terms of algorithms and symbolic representations of operations on data bits or binary digital signals within a computer memory. These algorithmic descriptions and representations may be the techniques used by those skilled in the data processing arts to convey the substance of their work to others skilled in the art. For example, certain logic described herein may be implemented using hardware techniques such as complementary metal oxide semiconductor (CMOS) technology or transistor-transistor logic (TTL), controller firmware, microcode, software techniques, and any combination thereof. The components described herein may also be incorporated into one or more integrated circuit (IC) packages (i.e., chips) which are fabricated on a die cut from a wafer.

Any use of the terms "first", "second", etc. does not necessarily infer a chronological relationship, and is used to facilitate discussion only. Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 1:
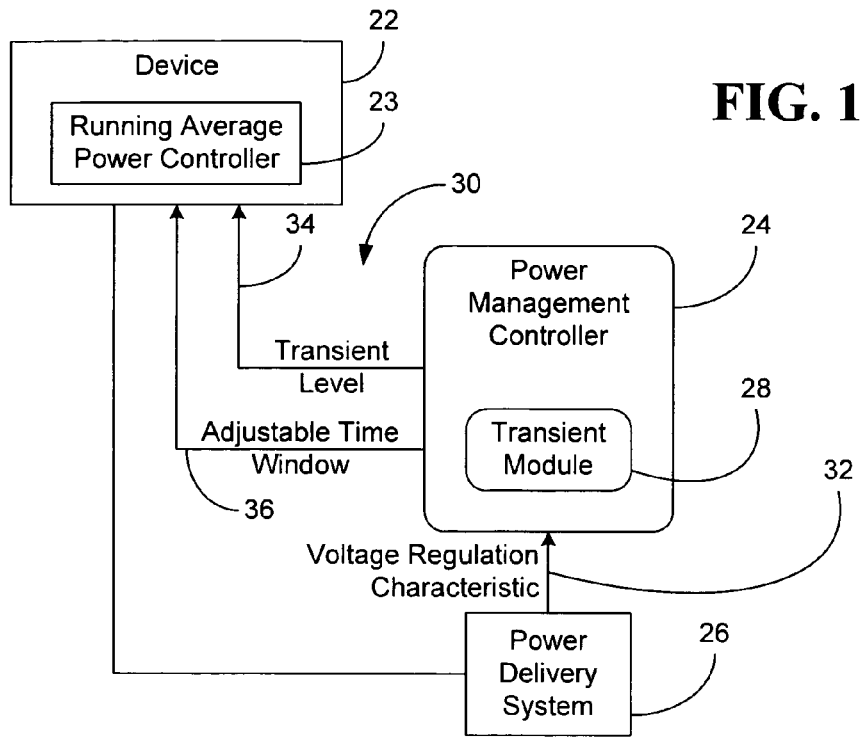
FIG. 1 is a block diagram of an example of an apparatus having a power management controller according to one embodiment.

FIG. 1 shows an apparatus 20 having a device 22, a power management controller 24 and a power delivery system 26. The device 22 may be a computing system component such as a microprocessor, an individual core of a multi-core microprocessor, a memory controller hub (MCH), an input/output controller hub (IOH), a memory device, a network interface, or any other type of power domain within a computing system. The term "power domain" is used herein to refer to any component or set of components capable of being monitored and controlled for power consumption. The illustrated power delivery system 26 could include a switching or linear voltage regulator (VR, not shown) capable of supplying a range of voltages to the device 22.

The illustrated power management controller 24, which includes a transient module 28, could be a third party element or included in the power delivery system 26, can be implemented in fixed functionality hardware, microcode, firmware, software, or any combination thereof. The transient module 28 can transmit a dynamic transient running average power limit ($RAPL_{transient}$) 30 to the device 22 based on a voltage regulation characteristic 32 of the power delivery system 26, where the $RAPL_{transient}$ 30 may include a transient level 34 and an adjustable time window 36. The $RAPL_{transient}$ 30 could either be transmitted directly to the device 22 or stored in an intermediate location such as a register or memory location, where the device 22 is able to retrieve the $RAPL_{transient}$ 30 as needed. In such a case, the register/memory location may be accessible by the device 22 and/or appropriate software running on the apparatus 20.

The adjustable time window 36 can define the amount of time for maintaining the transient power consumption of the device 22 at or below the transient level 34. As will be discussed in greater detail below, the device 22 may include a running average power controller (RAPC) 23 for monitoring and controlling transients within the device 22 based on the $RAPL_{transient}$ 30. Control over the transients can be achieved by modifying the performance of the device 22. By using an $RAPL_{transient}$ 30 with a relatively narrow time window 36 (e.g., 1 ms—other RAPLs with longer time windows may be employed), the illustrated apparatus 20 is able to ensure that the power spikes in the device 22 do not exceed the capabilities of the power delivery system 26. Furthermore, by monitoring and controlling the transient power consumption of the device 22 based on the voltage regulation characteristic 32 of the power delivery system, the illustrated approach enables the device 22 to take advantage of mode-specific efficiencies associated with the power delivery system 26.

Figure 2:
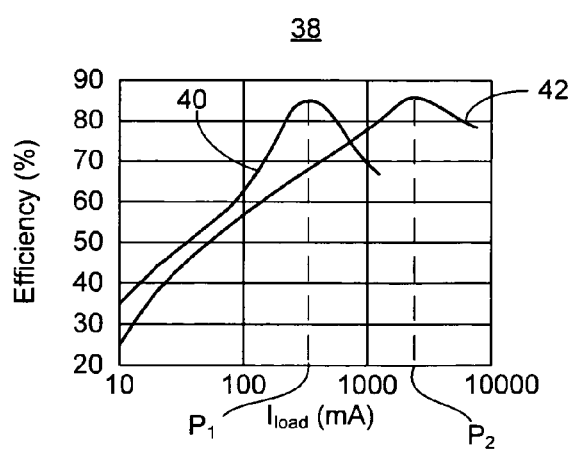
FIG. 2 is a plot of an example of power delivery system efficiency for a plurality of operating modes according to one embodiment.

To further demonstrate the latter advantage, FIG. 2 shows a plot 38 of power delivery efficiency versus load current (i.e., $I_{LOAD}$), for multiple modes of operation in a power delivery system. In particular, curve 40 may represent the efficiency of the power delivery system 26 (FIG. 1) operating in a low power mode, where the power delivery system achieves a maximum efficiency at a load current point $P_1$. Curve 42, on the other hand, may represent the power delivery system efficiency while operating in a high power mode. The maximum efficiency in the illustrated high power mode occurs at point $P_2$, which can correspond to a much greater load current than that of point $P_1$. Accordingly, the power delivery system may be most efficient at low current point $P_1$ when in the low power mode and most efficient at high current point $P_2$ when in the high power mode. Thus, the higher current associated with point $P_2$ may indicate an ability of the power delivery system to support greater transients for longer periods of time. Similarly, the lower current associated with point $P_1$ may indicate the ability to support lower transients for shorter periods of time.

With continuing reference to FIGS. 1 and 2, it can be seen that by including a power mode indicator in the voltage regulation characteristic 32, the illustrated approach enables the transient module 28 to effectively tailor the $RAPL_{transient}$ 30 to the current points $P_1$ and $P_2$. For example, if the power mode is a high power mode, the transient module 28 can select relatively high values for the transient level 34 and the time window 36, whereas if the power mode is a low power mode, the transient module 28 can select relatively low values for the transient level 34 and the time window 36. By way of example, the $RAPL_{transient}$ 30 could be set at a transient level of thirty watts over a time window of two milliseconds in the high power mode and a transient level of twenty watts over a time window of one millisecond in the low power mode. As a result, the apparatus 20 is able to maximize efficiency under either power mode. Such efficiency could be wasted if the $RAPL_{transient}$ 30 were determined without regard to the voltage regulation characteristics of the power delivery system. It will also be appreciated that the power delivery system 26 could use the $RAPL_{transient}$ 30 as feedback in selecting a power mode for the power delivery system 26.

Alternatively, the voltage regulation characteristic 32 could indicate a load current range for the power delivery system 26 that corresponds to the current demand, where the transient module determines the $RAPL_{transient}$ 30 based on the current range. In yet another example, the voltage regulation characteristic 32 could indicate the instantaneous efficiency of the power delivery system 26, where the transient module could adjust the $RAPL_{transient}$ 30 to improve the efficiency. Other voltage regulation characteristics may also be used to tune the behavior of power consumers.

Figure 3A:
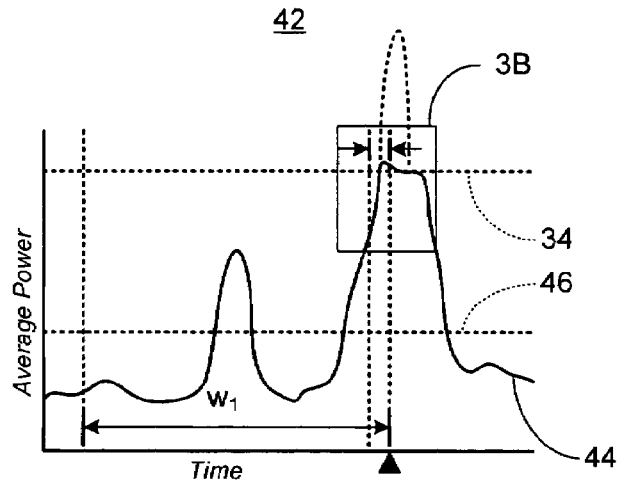
FIG. 3A is a plot of an example of average power consumption for a device according to one embodiment.
Figure 3B:
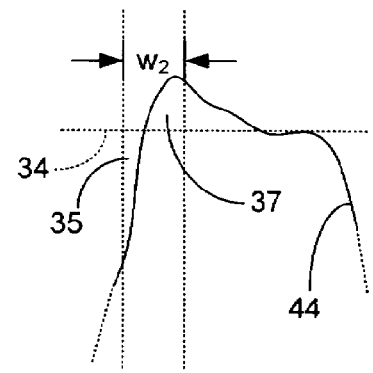
FIG. 3B is an enlarged view of an example of area 3B shown in FIG. 3A according to one embodiment.

Turning now to FIGS. 3A and 3B, a plot 42 of average power versus time for a device such as device 22 (FIG. 1) is shown. In particular, the illustrated curve 44 has an average power level 46 and an associated adjustable time window $w_1$, where $w_1$ defines the amount of time for maintaining the average power consumption of the device at or below the average power level 46. The average power level 46 and the time window $w_1$ can therefore be viewed as a thermal running average power limit ($RAPL_{thermal}$) that, in one example, may be determined based on the thermal influence of the device on one or more other devices. Thus, $w_1$ could be narrowed in response to detection of an overheating condition in a nearby device. Narrowing $w_1$ can provide tighter control over device power consumption. In the illustrated example, the $RAPL_{thermal}$ operates in conjunction with the $RAPL_{transient}$ shown in area 3B, where the $RAPL_{transient}$ may include a transient level 34 and an associated time window $w_2$. Alternatively, the $RAPL_{transient}$ could be employed by itself. For example, one approach could be to provide the device with a "turbo" mode in which short bursts of power consumption are permitted when the device is thermally unconstrained and the power delivery system is in the low power mode.

As already discussed, $w_2$ can define the amount of time for maintaining the transient power consumption of the device at or below the transient level 34. In the illustrated example, the area 35 of the curve 44 below the transient level 34 is kept greater than or equal to the area 37 of the curve 44 above the transient level 34. It can also be seen that the amount of time associated with the window $w_2$ can be much less than the amount of time associated with the window $w_1$ in order to provide sufficient control over and protection from the transient nature of the device power consumption. In addition, the illustrated transient level 34 is much greater than the average power level 46.

Figure 4:
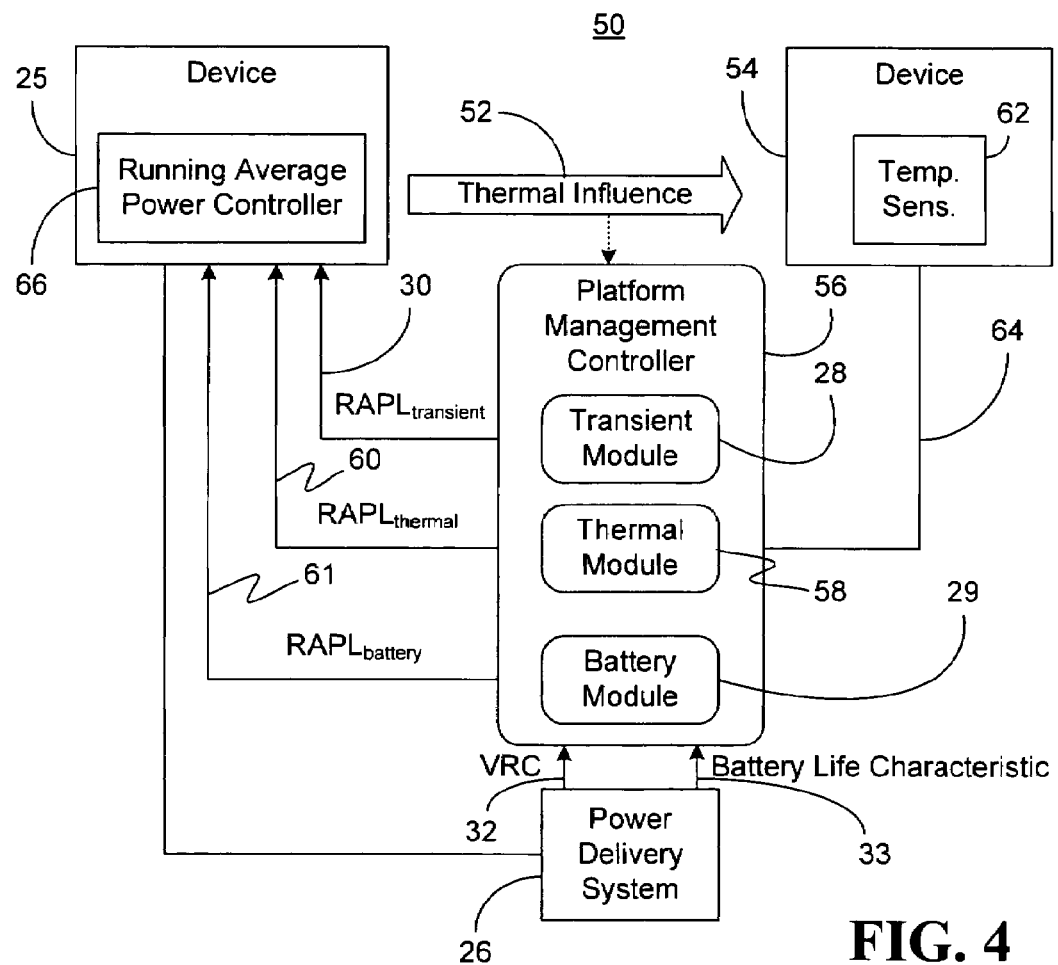
FIG. 4 is a block diagram of an example of an apparatus having a platform management controller according to one embodiment.

FIG. 4 shows an apparatus 50 in which a device 25 is a "source" device having a thermal influence 52 on a "target" device 54, such that a temperature change in the source device 25 can cause a temperature change in the target device 54. The nature and extent of the temperature change associated with the thermal influence 52 can be characterized and/or quantified in a number of different ways. For example, the thermal influence 52 could be reflected in a thermal influence factor, or "theta", which may quantify the temperature of the target device 54 for a given power level of the source device 25. Theta may therefore be measured in ° C./W.

In addition, the extent to which the thermal influence 52 is dampened may be provided by a thermal time constant, which effectively defines the amount of time required for the temperature change to be realized at the target device 54. For example, if the source device 25 and the target device 54 are located relatively far from one another, the thermal time constant might be rather high. Thermal time constants may also be a function of parameters such as airflow direction (e.g., fan considerations) and the extent to which the cooling system is shared (e.g., heat pipes and spreader considerations). A high thermal time constant could suggest that the source device 25 has a relatively weak thermal influence 52 on the target device, and a low thermal time constant could indicate a relatively strong thermal influence 52. The dampening effect on the thermal influence 52 could also be measured by a thermal mass characteristic, which relates to the overall heat storage capacity of a relationship between devices. Thus, if the relationship between the source device 25 and the target device 54 has a high thermal mass, the thermal influence would typically be weaker than that of a similarly situated relationship with a low thermal mass.

In the illustrated example, a platform management controller 56 has a transient module 28 for transmitting an $RAPL_{transient}$ 30 to the source device 25, a battery module 29 for transmitting an $RAPL_{battery}$ 61 to the source device 25 and a thermal module 58 for transmitting an $RAPL_{thermal}$ 60 to the source device 25. As already discussed, the $RAPL_{transient}$ 30 may be transmitted based on a voltage regulation characteristic 32 of a power delivery system 26 associated with the source device 25 and the $RAPL_{thermal}$ 60 may be transmitted based on the thermal influence 52 of the source device 25 over the target device 54. The $RAPL_{battery}$ 61 can be determined and/or transmitted based on a battery life characteristic 33 of the power delivery system 26, where the power delivery system may include a direct current (DC) source such as a notebook PC battery (not shown). For example, the $RAPL_{battery}$ 61 could include a time window that is narrowed as the life of the battery diminishes. Similarly, the $RAPL_{battery}$ 61 could specify an average power level that is decreased as the battery is depleted. In one embodiment, the time window of the $RAPL_{battery}$ 61 is much wider (e.g., minutes) than the time window of the $RAPL_{thermal}$ 60, and the average power level is lower than that of the $RAPL_{thermal}$ 60.

With regard to thermal control, the illustrated target device 54 includes a temperature sensor 62 capable of generating a temperature signal 64 for use in determining the $RAPL_{thermal}$ 60. The illustrated source device 25 includes a running average power controller 66 capable of receiving the $RAPL_{transient}$ 30 and controlling power spikes within the source device 25 so that the $RAPL_{transient}$ 30 is not exceeded. Similarly, the running average power controller 66 may receive the $RAPL_{thermal}$ 60 and control long-term average power consumption of the source device 25 so that the $RAPL_{thermal}$ 60 is not exceeded.

The running average power controller 66, which may exist within the source device 25 or as a third party element, can include software and/or circuitry to ensure that the source device 25 meets the constraints of any active $RAPL_{thermal}$ 60, $RAPL_{battery}$ 61 and $RAPL_{transient}$ 30. In this regard, it should be noted that the source device 25 may have a thermal influence over multiple target devices, where each target device could be associated with an individual $RAPL_{thermal}$ 60. Because multiple $RAPL_{thermal}$ 60 signals with differing average power levels and/or time window elements may be active at any given time, the running average power controller 66 is able to handle (e.g., coalesce) simultaneous limits. The illustrated running average power controller 66 can measure the area below and above the specified average power level and transient level for the given time windows, and can equalize these areas by increasing/decreasing performance with very fine-grain control. As a result, the running average power controller 66 is able to react quickly to (the source device's response to) workload variations.

Although the running average power controller 66 could continuously monitor its power consumption in accordance with the time windows and compare the monitored power consumption to the thresholds defined by the $RAPL_{transient}$ 30, $RAPL_{battery}$ 61 and $RAPL_{thermal}$ 60, it may be desirable to reduce the processing load placed on the source device 25 by such activity. The running average power controller 66 may therefore alternatively take a periodic power consumption measurement at a rate much less than the rate required by the time window of the $RAPL_{thermal}$ 60, where the "managed rate" can primarily depend on the transitional cost (e.g., latency and power overhead) of any change in performance state on the source device 25. There may be an inherent tradeoff here on how fast the running average power controller 66 can switch the source device's performance without incurring overhead that defeats any benefit. In one embodiment, it would be possible to make hundreds of fine-grain performance changes within each time window—allowing a very dynamic response from the source device 25 to address variations in the workload as well as variations in the source device's response to the workload.

Figure 5:
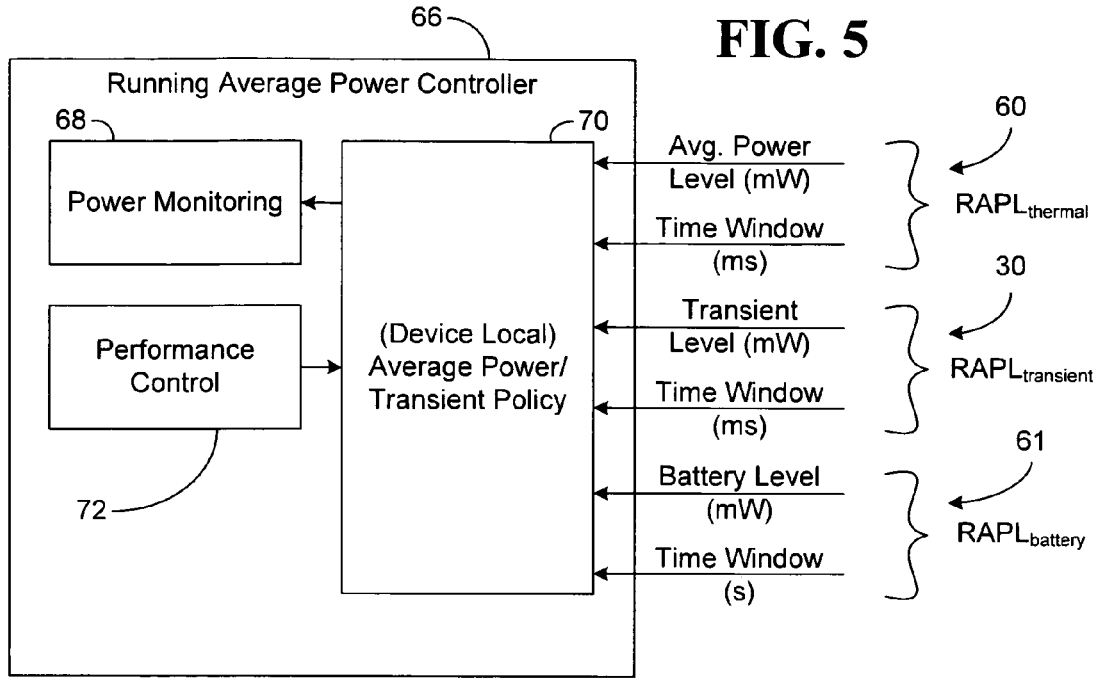
FIG. 5 is a block diagram of an example of a running average power controller according to one embodiment.

FIG. 5 illustrates that the running average power controller (RAPC) 66 can therefore use a power monitoring module 68 to compare the power consumption measurement to a power monitoring threshold. If the power monitoring threshold is exceeded, the power controller 66 may then engage a power policy 70 by monitoring the transient and average power consumption of the source device 25 (FIG. 4) more frequently in accordance with the time window of the $RAPL_{transient}$ 30 and the time window of the $RAPL_{thermal}$ 60, respectively. It should be noted that if an $RAPL_{thermal}$ 60 is not employed, the power controller 66 can monitor only the transient power in accordance with the $RAPL_{transient}$ 30 transient level and time window. A performance controller 72 can then be used to select a performance level for the source device based on the average power consumption, the transient level of the $RAPL_{transient}$ 30 and the average power level of the $RAPL_{thermal}$ 60.

Performance levels may be defined and selected in a number of different ways. One approach is to select a performance state, or Px state, as defined in the Advanced Configuration and Power Interface Specification (ACPI Specification, Rev. 3.0, Sep. 2, 2004), where a device in the P0 state uses maximum performance capability and may consume maximum power, a device in the P1 state has a performance capability that is limited below its maximum and consumes less than maximum power, and so on.

Figure 6:
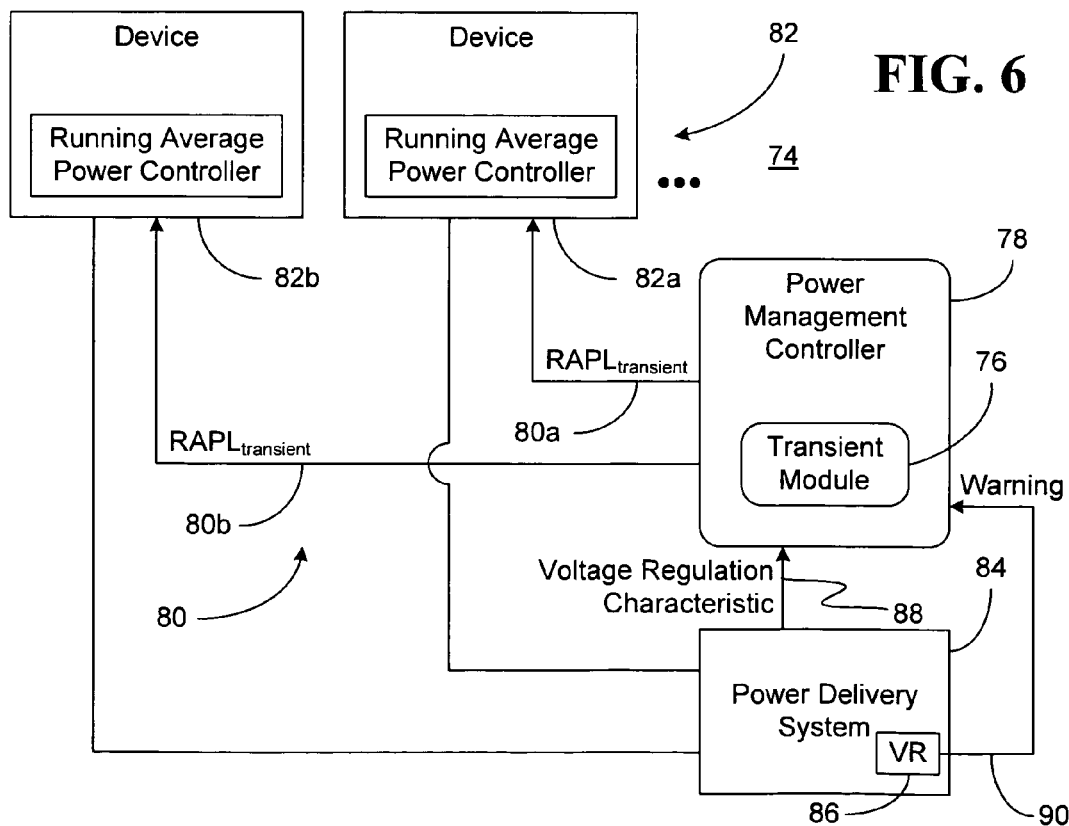
FIG. 6 is a block diagram of an example of an apparatus having a power management controller according to one embodiment.

Turning now to FIG. 6, an apparatus 74 is shown in which each of a plurality of devices 82 (82a-82b) share a power delivery system 84 and a transient module 76 of a power management controller 78 is able to transmit a transient running average power limit ($RAPL_{transient}$) 80 (80a-80b) to each of the plurality of devices 82 based on a voltage regulation characteristic 88. Each $RAPL_{transient}$ 80 may be the same or different, depending upon the circumstances. A failsafe mechanism can be employed that enables a voltage regulator (VR) 86 of the power delivery system 84 to convey near-limit warnings to the power management controller 78 in order to avoid unnecessary guardbands being imposed on one or more of the devices 82. For example, if each device 82 is within its respective $RAPL_{transient}$ 80, but the load current resulting from combination of the two devices 82 causes the efficiency of the voltage regulator 86 to deteriorate significantly, the transient module 76 could lower the transient level and narrow the time window of one of the $RAPL_{transients}$, leaving the other unchanged. Thus, the transient module 76 is able to receive a warning 90 if the power delivery system is near a voltage regulation threshold and reduce the $RAPL_{transient}$ 80 for only a subset of the plurality of devices 82 in response to the warning 90. Without such a feature, the $RAPL_{transient}$ 80 for each device may have to be artificially limited to keep the plurality of devices 82 from exceeding the capability of the VR 86.

Figure 7:
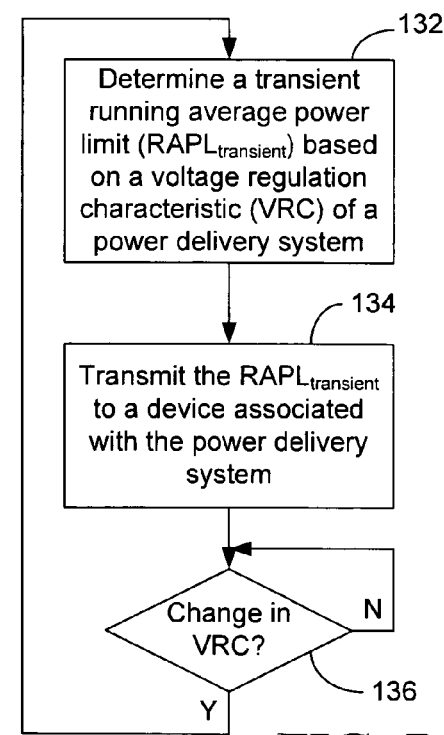
FIG. 7 is a flowchart of an example of a method of power management according to one embodiment.

FIG. 7 shows a method 130 of power management. The method 130 may be implemented in fixed functionality hardware, microcode, firmware, software, or any combination thereof. For example, a particular firmware implementation might involve the storage of a set of instructions to a programmable read only memory (PROM), where when executed by a processing platform the instructions cause the processing platform to perform the operations show in the method 130. Processing block 132 provides for determining a transient running average power limit ($RAPL_{transient}$) based on a characteristic of a power delivery system. The $RAPL_{transient}$ is transmitted to a device associated with the power delivery system at block 134. If a change in the characteristic is detected at block 136, the $RAPL_{transient}$ is re-determined and re-transmitted at blocks 132 and 134, respectively.

Figure 8:
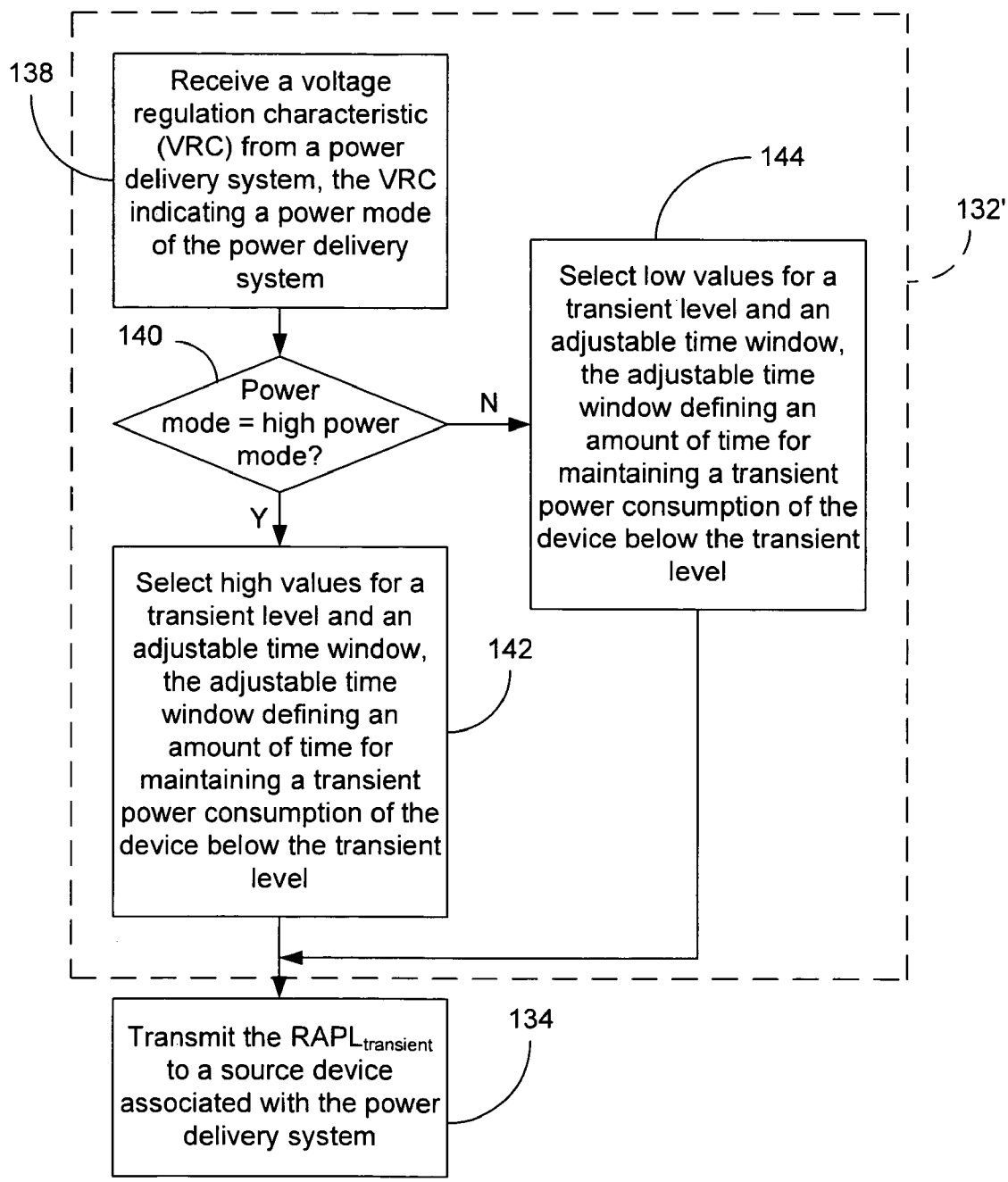
FIG. 8 is a flowchart of an example of a process of determining a transient running average power limit according to one embodiment.

FIG. 8 shows one approach to determining the $RAPL_{transient}$ in greater detail at block 132'. In particular, a voltage regulation characteristic can be received from the power delivery system at block 138, where the characteristic indicates a power mode of the delivery system, where the power mode can convey power efficiency characteristics under different load conditions. As already discussed, the characteristic could alternatively indicate a load current range, an instantaneous efficiency or any other suitable characteristic of the power delivery system. If the power mode is determined to be a high power mode at block 140, relatively high values can be selected for a transient level and an associated time window at block 142, where the time window may define the amount of time for maintaining the transient power consumption of the device below the transient level. If the power mode is a low power mode block 144 provides for selecting relatively low values for the transient level and the associated time window.

Figure 9:
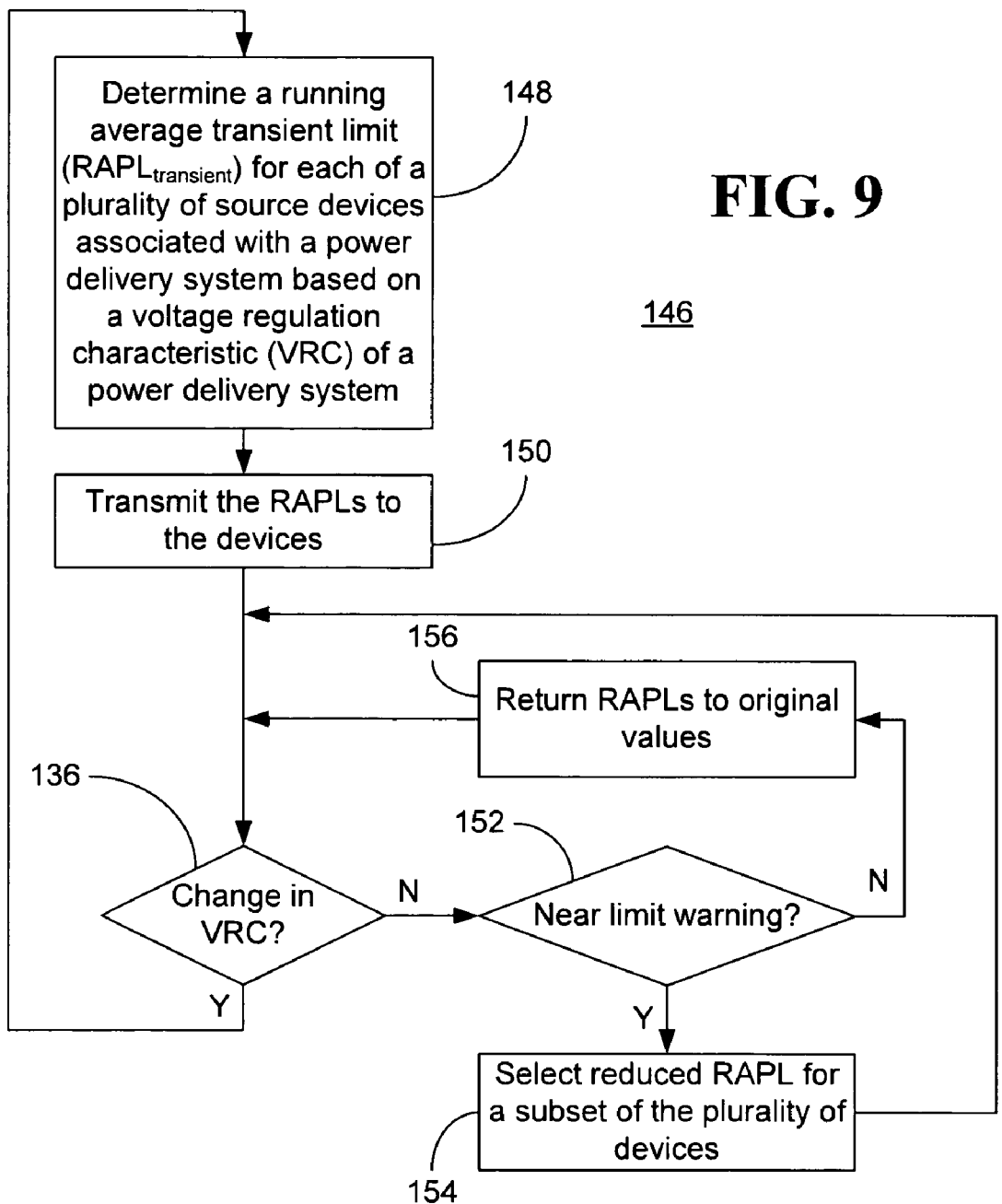
FIG. 9 is a flowchart of an example of a method of power management according to one embodiment.

Turning now to FIG. 9, an alternative method 146 of power management is shown in which a plurality of devices share a power delivery system. In particular, block 148 provides for determining a transient running average power limit ($RAPL_{transient}$) for each of the plurality of devices based on a voltage regulation characteristic of the shared power delivery system or equivalently on the same voltage rail. Block 150 provides for transmitting each $RAPL_{transient}$ to a corresponding device. If a change in the characteristic is detected at block 136, each $RAPL_{transient}$ can be re-determined and re-transmitted. Otherwise, block 152 provides for determining whether a near limit warning is present. If so, the $RAPL_{transient}$ can be reduced for only a subset of the devices at block 154 in order to enable the remaining devices to operate at higher $RAPL_{transient}$s. If a near limit warning is not present, each $RAPL_{transient}$ can be returned to its original value at block 156.

Figure 10:
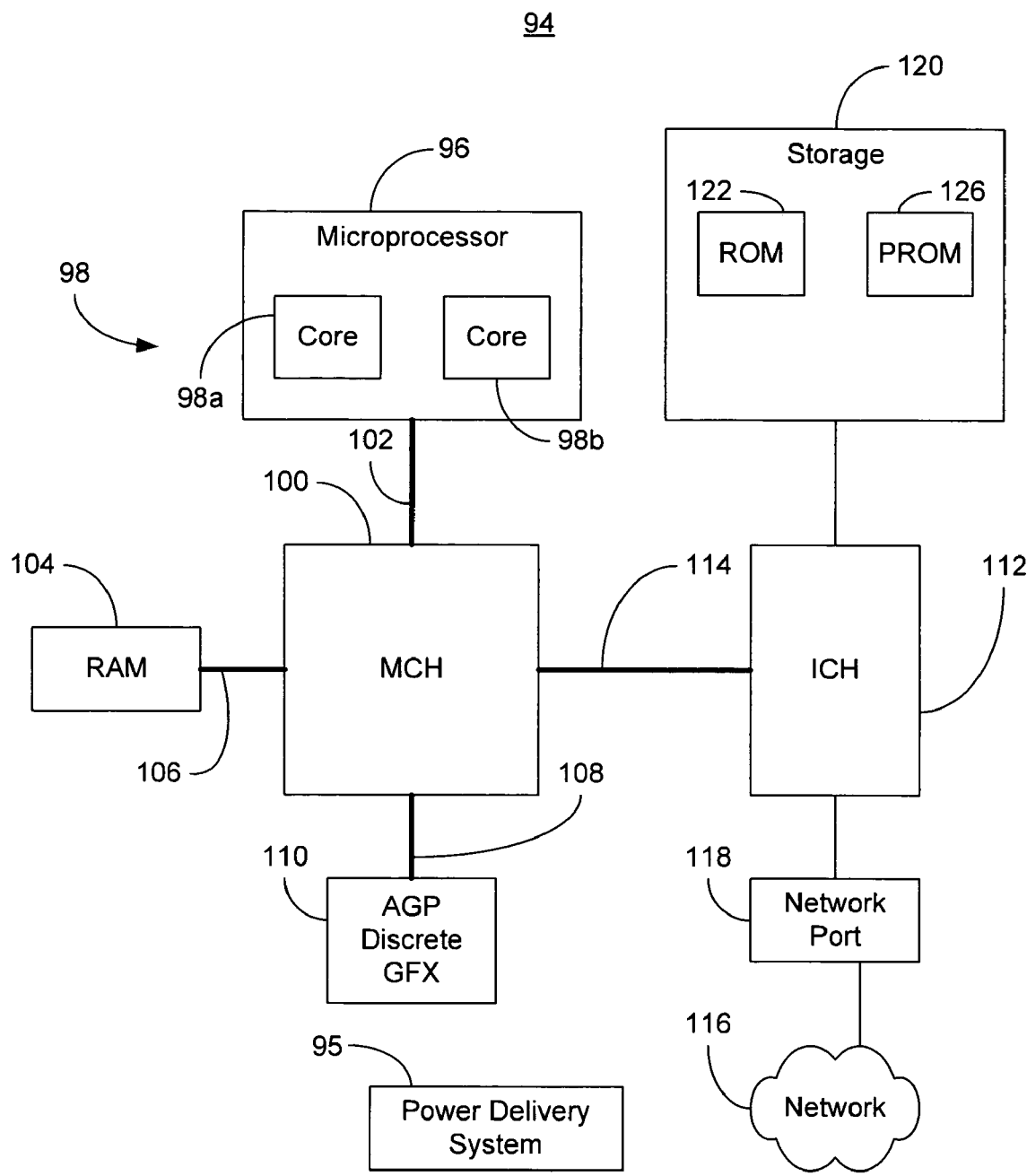
FIG. 10 is a block diagram of an example of a system according to one embodiment.

FIG. 10 shows an example of a system 94. The system 94 may be part of a server, desktop personal computer (PC), notebook PC, personal digital assistant (PDA), wireless "smart" phone, etec. The illustrated system 94 has a microprocessor 96 with a plurality of processor cores 98 (98a-98b), where each core may be fully functional with instruction fetch units, instruction decoders, level one (L1) cache, execution units, and so on. The microprocessor 96 can communicate with a memory controller hub (MCH). 100, also known as a Northbridge, via a front side bus 102. The front side bus 102 could alternatively be replaced by a point-to-point fabric that interconnects each of the components in the system 94. The MCH 100 can communicate with system random access memory (RAM) 104 via a memory bus 106. The MCH 100 may also communicate via a graphics bus 108 with an advanced graphics port (AGP) 110 to interface with an external video display unit (not shown). The illustrated MCH 100 communicates with an I/O controller hub (ICH) 112, also known as a Southbridge, via a peripheral component interconnect (PCI) bus 114. The microprocessor 96 may also be operatively connected to a network 116 via a network port 118 through the ICH 112.

The ICH may also be coupled to storage 120, which may include a read only memory (ROM) 122, programmable ROM (PROM) 126, flash memory, etc. In one embodiment, the PROM 126 includes a stored set of instructions which if executed are operable to conduct power and/or thermal management as described above, where each of the microprocessor 96, individual cores 98, MCH 100, ICH 112, RAM 104, network port 118, etc., represent power domains and/or devices that can be supported by a power delivery system 95. Thus, one or more $RAPL_{transient}$ signals can be issued to each of the components in the system 94 in order to control the transient power consumption of the components and maximize the efficiency of the power delivery system 95.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/lor non-volatile memory, such as storage devices and/or an associated machine readable or machine accessible medium including sot id-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices.

One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
    a power management controller having:
        a transient module to transmit a transient running average power limit including a transient level and a first adjustable time window to a first device based on a voltage regulation characteristic of a power delivery system associated with the first device, wherein the first adjustable time window defines a first amount of time for maintaining a transient power consumption of the first device below the transient level and the second adjustable time window defines a second amount of time for maintaining an average power consumption of the first device below the average power level; and
        a thermal module to transmit a thermal running average power limit including an average power level and a second adjustable time window to the first device based on a thermal influence of the first device on a second device, wherein the transient level is to be greater than the average power level and the first amount of time is to be less than the second amount of time.

2. The apparatus of claim 1, wherein the transient module is to receive the voltage regulation characteristic from the power delivery system, the characteristic to indicate a power mode of the power delivery system, the transient module to determine the transient running average power limit based on the power mode.

3. The apparatus of claim 2, wherein the transient module is to select relatively high values for the transient level and the first amount of time if the power mode is a high power mode, and select relatively low values for the transient level and the first amount of time if the power mode is a low power mode.

4. The apparatus of claim 1, wherein the transient module is to transmit the transient running average power limit to each of a plurality of first devices based on the voltage regulation characteristic, receive a warning if the power delivery system is near a voltage regulation threshold, and reduce the transient running average power limit for only a subset of the plurality of first devices in response to the warning.

5. A method comprising:
    transmitting a transient running average power limit including transmitting a transient level and a first adjustable time window to the first device to a first device based on a voltage regulation characteristic of a power delivery system associated with the first device, wherein the first adjustable time window defines a first amount of time for maintaining a transient power consumption of the first device below the transient level and the second adjustable time window defines a second amount of time for maintaining an average power consumption of the first device below the average power level; and
    transmitting a thermal running average power limit including an average power level and a second adjustable time window to the first device based on a thermal influence of the first device on a second device. wherein die transient level is greater than the average power level and the first amount of time is less than the second amount of time.

6. The method of claim 5, further including:
    receiving the voltage regulation characteristic from the power delivery system, the voltage regulation characteristic indicating a power mode of the power delivery system; and
    determining the transient running average power limit based on the power mode.

7. The method of claim 6, wherein the determining includes:
    selecting relatively high values for the transient level and the first amount of time if the power mode is a high power mode; and
    selecting relatively low values for the transient level and the first amount of time if the power delivery system is in a low power mode.

8. The method of claim 5, further including:
    transmitting the transient running average power limit to each of a plurality of first devices based on the voltage regulation characteristic;
    receiving a warning if the power delivery system is near a voltage regulation threshold; and
    reducing the transient running average power limit for only a subset of the plurality of first devices in response to the warning.

9. A computing system comprising:
    a first device;
    a power delivery system having a voltage regulation characteristic; and
    a programmable read only memory (PROM) including a set of stored instructions which if executed, cause the computing system to transmit a transient running average power limit including transmitting a transient level and a first adjustable time window to the first device to a first device based on a voltage regulation characteristic; and transmit a thermal running average power limit including an average power level and a second adjustable time window to the first device based on a thermal influence of the first device on a second device, wherein the first adjustable time window defines a first amount of time for maintaining a transient power consumption of the first device below the transient level and the second adjustable time window defines a second amount of time for maintaining an average power consumption of the first device below the average power level and the transient level is to be greater than the average power level and the first amount of time is to be less than the second amount of time.

10. The computing system of claim 9, wherein the transient module is to receive the voltage regulation characteristic from the power delivery system, the characteristic to indicate a power mode of the power delivery system, the instructions being further operable to cause the computing system to determine the transient running average power limit based on the power mode.

11. The computing system of claim 10, wherein the instructions are further operable to cause the computing system to select relatively high values for the transient level and the first amount of time if the power mode is a high power mode, and select relatively low values for the transient level and the first amount of time if the power mode is a low power mode.

12. The computing system of claim 9, further including a plurality of first devices, the instructions being further operable to cause the computing system to transmit the transient running average power limit to each of the plurality of first devices based on the voltage regulation characteristic, receive a warning from the power delivery system if the power delivery system is near a voltage regulation threshold, and reduce the transient running average power limit for only a subset of the plurality of first devices in response to the warning.

13. The computing system of claim 9, wherein the power delivery system is to adjust a power mode of the power delivery system based on the transient running average power limit.

14. An article comprising a machine-readable medium that contains instructions, which when executed by a processing platform, cause the processing platform to perform operations comprising:
   receiving a voltage regulation characteristic from a power delivery system, the voltage regulation characteristic to indicate a power mode of the power delivery system;
   determining a transient running average power limit based on the power mode, the transient running average power limit to include a transient level and a first adjustable time window, the first adjustable time window to define a first amount of time for maintaining a transient power consumption of a first device below the transient level;
   transmitting the transient running average power limit to the first device; and
   transmitting a thermal running average power limit to a first device based on a thermal influence of the first device on a second device, the thermal running average power limit to include an average power level and a second adjustable time window, the second adjustable time window to define a second amount of time for maintaining an average power consumption of the first device below the average power level, wherein the transient level is to be greater than the average power level and the first amount of times is to be less than the second amount of time.

15. The article of claim 14, wherein when executed by the processing platform, the instructions cause the processing platform to perform operations comprising:
   selecting relatively high values for the transient level and the first amount of time if the power mode is a high power mode; and
   selecting relatively low values for the transient level and the first amount of time if the power mode is a low power mode.

16. The article of claim 14, wherein when executed by the processing platform, the instructions cause the processing platform to perform operations comprising:
   transmitting the transient running average power limit to each of a plurality of first devices based on the voltage regulation characteristic;
   receiving a warning if the power delivery system is near a voltage regulation threshold; and
   reducing the transient running average power limit for only a subset of the plurality of first devices in response to the warning.

* * * * *

UNITED STATES PATENT AND TRADEMARK OFFICE
CERTIFICATE OF CORRECTION

| | | |
|---|---|---|
| PATENT NO. | : 7,484,108 B2 | Page 1 of 1 |
| APPLICATION NO. | : 11/165603 | |
| DATED | : January 27, 2009 | |
| INVENTOR(S) | : Diefenbaugh et al. | |

It is certified that error appears in the above-identified patent and that said Letters Patent is hereby corrected as shown below:

In column 11, at line 30 after "a" insert --tangible--.

Signed and Sealed this

Third Day of August, 2010

David J. Kappos
*Director of the United States Patent and Trademark Office*